(12) United States Patent
Huang et al.

(10) Patent No.: US 12,287,460 B2
(45) Date of Patent: Apr. 29, 2025

(54) OPTICAL IMAGING LENS OF REDUCED SIZE, IMAGING MODULE, AND ELECTRONIC DEVICE

(71) Applicant: HON HAI PRECISION INDUSTRY CO., LTD., New Taipei (TW)

(72) Inventors: Gwo-Yan Huang, New Taipei (TW); Chia-Chih Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 632 days.

(21) Appl. No.: 17/577,128

(22) Filed: Jan. 17, 2022

(65) Prior Publication Data

US 2022/0252842 A1     Aug. 11, 2022

(30) Foreign Application Priority Data

Feb. 9, 2021   (CN) .......................... 202110180612.3

(51) Int. Cl.
*G02B 13/00* (2006.01)
*G02B 9/60* (2006.01)
*G02B 13/06* (2006.01)

(52) U.S. Cl.
CPC ............ *G02B 13/0045* (2013.01); *G02B 9/60* (2013.01); *G02B 13/06* (2013.01)

(58) Field of Classification Search
CPC ....... G02B 13/0045; G02B 9/60; G02B 13/06
USPC .................................................. 359/714, 725
See application file for complete search history.

(56) References Cited

U.S. PATENT DOCUMENTS

2018/0341086 A1* 11/2018 Tseng ....................... G02B 9/60
2020/0379217 A1* 12/2020 Huang .................. G02B 13/04
2022/0326481 A1* 10/2022 Xie .................... G02B 13/0045

FOREIGN PATENT DOCUMENTS

CN            111679402 A      9/2020
WO    WO-2021174408 A1 *  9/2021 ......... G02B 13/0045

\* cited by examiner

*Primary Examiner* — George G. King
(74) *Attorney, Agent, or Firm* — ScienBiziP, P.C.

(57) ABSTRACT

An optical imaging lens, an imaging module, and an electronic device are provided. The optical imaging lens, from an object side to an image side, is composed of a first lens, a second lens, a third lens, a fourth lens, and a fifth lens. The optical imaging lens satisfies following formula: $24<(V5-V4)/(TL5-TL4)<42$, $48<FOV/FNO<52$. Wherein V4 is a dispersion coefficient of the fourth lens, V5 is a dispersion coefficient of the fifth lens, TL4 is a distance from an object surface of the fourth lens to an image plane of the optical imaging lens along an optical axis, TL5 is a distance from an object surface of the fifth lens to the image plane along the optical axis, FOV is a field of view of the optical imaging lens, and FNO is F-number of the optical imaging lens.

18 Claims, 14 Drawing Sheets

OPTICAL IMAGING LENS OF REDUCED SIZE, IMAGING MODULE, AND ELECTRONIC DEVICE

FIELD

The subject matter relates to optical technologies, and more particularly, to an optical imaging lens, an imaging module having the optical imaging lens, and an electronic device having the imaging module.

BACKGROUND

A wide-angle lens has a smaller focal length than that of a standard lens, a field of view larger than that of the standard lens and smaller than that of a fisheye lens, and a focal length larger than that of the fisheye lens.

The wide-angle lens may include five individual lenses. When the field of view of the wide-angle lens is 120 degrees, its total track length may be large (about 7 mm), and its aperture may be smaller. Therefore, such a large lens cannot be applied in a small electronic device, and have a poor imaging quality.

BRIEF DESCRIPTION OF THE DRAWINGS

Implementations of the present technology will now be described, by way of example only, with reference to the attached figures.

DETAILED DESCRIPTION

Figure 1:
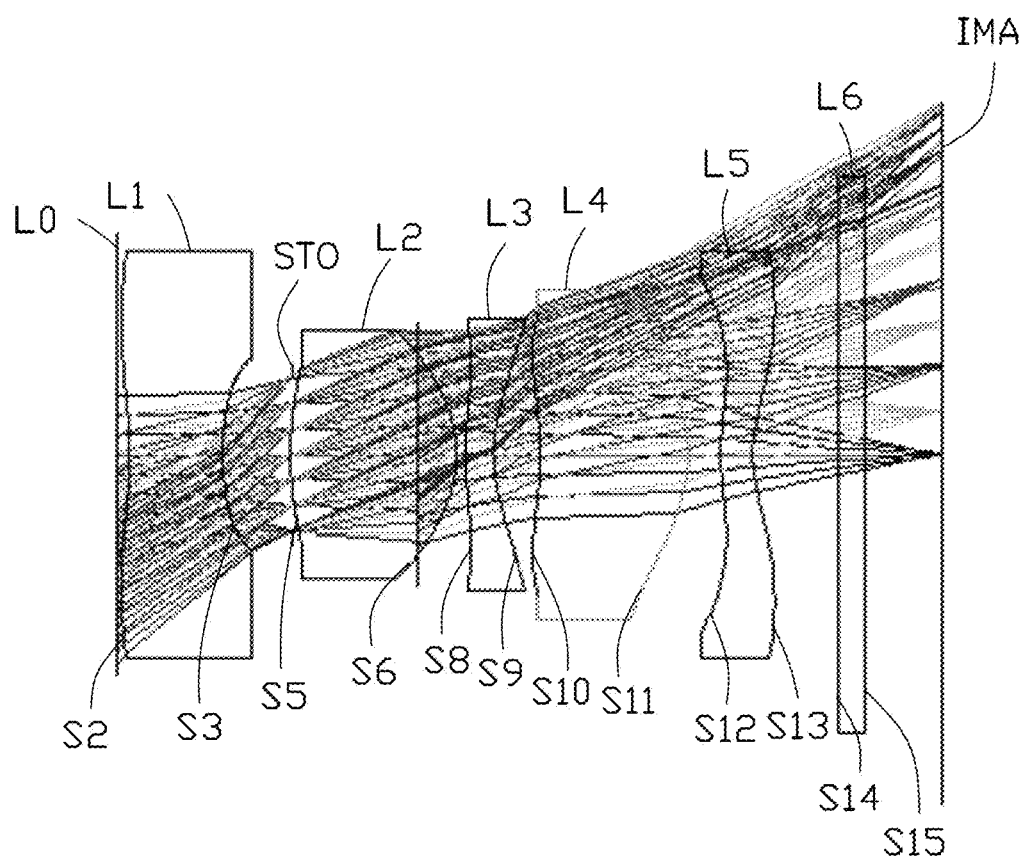
FIG. 1 is a diagrammatic view of a first embodiment of an optical imaging lens according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, an embodiment of an optical imaging lens 10 is provided. The optical imaging lens 10 includes, from object side to image side, a first lens L1, a second lens L2, a third lens L3, a fourth lens L4, and a fifth lens L5.

The first lens L1 has an object surface S2 and an image surface S3. The second lens L2 has an object surface S5 and an image surface S6. The third lens S3 has an object surface S8 and an image surface S9. The fourth lens has an object surface S10 and an image surface S11. The fifth lens L5 has an object surface S12 and an image surface S13. In FIG. 1, a virtual surface L0 is disposed on the object surface S2 of the first lens L1.

The optical imaging lens 10 satisfies following formula:

$$24<(V5-V4)/(TL5-TL4)<42, 48<FOV/FNO<52. \quad \text{(formula (1))}$$

Wherein, V4 is a dispersion coefficient of the fourth lens L4, V5 is a dispersion coefficient of the fifth lens L5, TL4 is a distance from the object surface S10 of the fourth lens L4 to the image plane IMA of the optical imaging lens 10 along the optical axis, TL5 is the distance from the object surface S12 of the fifth lens L5 to the image plane IMA of the optical imaging lens 10 along the optical axis, FOV is a field of view of the optical imaging lens 10, and FNO is the F-number of the optical imaging lens 10. When the above formula is satisfied, the field of view and the F-number of the optical imaging lens 10 can be balanced, so that the amount of input light and the field of view can both meet requirements. For example, when the F-number is 2.4, the field of view can reach 120 degrees, and the imaging quality is good. Furthermore, a total track length of the optical imaging lens 10 is reduced, which allows the optical imaging lens 10 to be applied in an electronic device in miniaturized form.

In some embodiments, the optical imaging lens 10 further satisfies following formula (2):

$$36°/\text{mm}<FOV/TL4<64°/\text{mm}. \quad \text{(formula (2))}$$

Wherein, FOV is the field of view of the optical imaging lens 10, and TL4 is a distance from the object surface S10 of the fourth lens L4 to the image plane IMA of the optical imaging lens 10 along the optical axis. When the above formula is satisfied, the refraction angle of the incident rays, when entering the optical imaging lens 10, will change gently. Thus, excessive aberration of the optical imaging lens 10 and stray rays can be avoided, so that the imaging quality can be improved. Furthermore, the optical imaging lens 10 can have a large field of view, which can capture images in close range.

In some embodiments, the optical imaging lens 10 further satisfies following formula (3):

$$66°/\text{mm}<FOV/TL5<115°/\text{mm}. \quad \text{(formula (3))}$$

Wherein, FOV is the field of view of the optical imaging lens 10, and TL5 is a distance from the object surface S12 of the fifth lens L5 to the image plane IMA of the optical imaging lens 10 along the optical axis. When the above formula is satisfied, the refraction angle of the incident rays, when entering the optical imaging lens 10, will change gently. Thus, excessive aberration of the optical imaging lens 10 and stray rays can be avoided, so that the imaging quality can be improved. Furthermore, the optical imaging lens 10 can have a large field of view, which can capture images in close range.

In some embodiments, the optical imaging lens 10 further satisfies following formula (4):

$1.5 < Imgh/epd < 4.$ (formula (4))

Wherein, Imgh is half of the image height corresponding to the maximum field of view of the optical imaging lens 10, and EPD is the entrance pupil diameter of the optical imaging lens 10. When the above formula is satisfied, when images are formed on a large target surface of the image plane IMA, the brightness of the image plane IMA can be increased. When the value of Imgh/epd exceeds or equals to 4, the entrance pupil diameter of the optical imaging lens 10 is small, which reduces the width of ray bundles entering the optical imaging lens 10, so that the brightness of the image plane IMA cannot be increase. When the value of Imgh/epd does not reach 1.5, the size of the image plane IMA is reduced, which then reduces the field of view of the optical imaging lens 10.

In some embodiments, the optical imaging lens 10 further satisfies following formula (5):

$1.6 < TTL/Imgh < 4.4.$ (formula (5))

Wherein, TTL is a distance from the object surface S2 of the first lens L1 to the image plane IMA of the optical imaging lens 10 along the optical axis, and Imgh is half of the image height corresponding to the maximum field of view of the optical imaging lens 10. When the above formula is satisfied, the optical imaging lens 10 has a small total track length, which can be applied in an electronic device in miniaturized form.

In some embodiments, the optical imaging lens 10 further satisfies following formula (6):

$1.5 \text{ mm} < EFL < 4 \text{ mm}.$ (formula (6))

Wherein, EFL is the effective focal length of the optical imaging lens 10.

In some embodiments, the optical imaging lens 10 further satisfies following formula (7):

$2.5 < V4/V5 < 3.$ (formula (7))

Wherein, V4 is a dispersion coefficient of the fourth lens L4, and V5 is a dispersion coefficient of the fifth lens L5. When the above formula is satisfied, the color difference can be corrected.

In some embodiments, the optical imaging lens 10 further satisfies following formula (8):

$95 < FOV/TL5 < 105, 1 < FNO/TL4 < 1.5.$ (formula (8))

Wherein, FOV is the maximum field of view of the optical imaging lens 10, TL5 is the distance from the object surface S12 of the fifth lens L5 to the image plane IMA along the optical axis, FNO is the F-number of the optical imaging lens 10, and TL4 is the distance from the object surface S10 of the fourth lens L4 to the image plane IMA along the optical axis. When the above formula is satisfied, the refraction angle of the incident rays, when entering the optical imaging lens 10, will change gently. Thus, excessive aberration of the optical imaging lens 10 and stray rays can be avoided, so that the imaging quality can be improved. Furthermore, the optical imaging lens 10 can have a large focal length, which allows the optical imaging lens 10 to capture images in long range. The optical image 10 can also have a large field of view, which allows the optical imaging lens 10 to capture images in close range.

In some embodiments, the optical imaging lens 10 also includes a stop STO disposed on a surface of any one of the lenses. The stop STO can also be disposed before the first lens L1. The stop STO can also be sandwiched between any two lenses. For example, as shown in FIG. 1, the stop STO is disposed between the first lens L1 and the second lens L2. The stop STO can be a glare stop or a field stop, and can reduce stray rays and improve the image quality.

In some embodiments, the optical imaging lens 10 also includes an infrared filter L6 having an object surface S14 and an image surface S15. The infrared filter L6 is arranged on the image surface S13 of the fifth lens L5. The infrared filter L6 can filter visible rays and only allow infrared rays to pass through, so that the optical imaging lens 10 can also be used in a dark environment.

First Embodiment

Referring to FIG. 1, the optical imaging lens 10, from object side to image side, is composed of a first lens L1, a stop STO, a second lens L2, a third lens L3, a fourth lens L4, a fifth lens L5, and an infrared filter L6 from the object side to the image side.

The object surface S2 of the first lens L1 is concave near the optical axis, and the image surface S3 of the first lens L1 is concave near the optical axis. The object surface S5 of the second lens L2 is convex near the optical axis, and the image surface S6 of the second lens L2 is convex near the optical axis. The object surface S8 of the third lens L3 is convex near the optical axis, and the image surface S9 of the third lens L3 is concave near the optical axis. The object surface S10 of the fourth lens L4 is concave near the optical axis, and the image surface S11 of the fourth lens L4 is convex near the optical axis. The object surface S12 of the fifth lens L5 is convex near the optical axis, the image surface S13 of the fifth lens L5 is concave near the optical axis. Each of the object surface S12 and the image surface S13 of the fifth lens L5 has at least one inflection point.

When the optical imaging lens 10 is used, rays from the object side enter the optical imaging lens 10, successively pass through the first lens L1, the stop STO, the second lens L2, the third lens L3, the fourth lens L4, the fifth lens L5, and the infrared filter L6, and finally converge on the image plane IMA.

Table 1 shows characteristics of the optical imaging lens 10. The reference wavelength of focal length, refractive index, and Abbe number is 588 nm, and the units of radius of curvature, thickness, and semi-diameter are in millimeters (mm).

TABLE 1

First embodiment
EFL = 2.182 mm, FNO = 2.4, FOV = 118.97°

| surface | lens | type of surface | radius of curvature | thickness | material | refractive index | Abbe number | semi-diameter | conic constant |
|---|---|---|---|---|---|---|---|---|---|
| OBJ | | standard surface | infinite | 6330 | | | | 10740 | 0.000 |
| S1 | | standard surface | infinite | 0.100 | | | | 1.766 | 0.000 |
| S2 | first lens | aspherical surface | −2.990 | 0.750 | glass | 1.54 | 56 | 1.638 | −12.696 |
| S3 | | aspherical surface | 3.388 | 0.553 | | | | 0.784 | 17.130 |
| STO | | standard surface | infinite | −0.008 | | | | 0.617 | 0.000 |
| S5 | second lens | aspherical surface | 2.896 | 1.335 | glass | 1.54 | 56 | 0.714 | 13.617 |
| S6 | | aspherical surface | −0.956 | −0.315 | | | | 0.969 | −1.279 |
| S7 | | standard surface | infinite | 0.380 | | | | 0.820 | 0.000 |
| S8 | third lens | aspherical surface | 2.000 | 0.229 | glass | 1.66 | 20.4 | 1.004 | −10.024 |
| S9 | | aspherical surface | 1.105 | 0.382 | | | | 1.069 | −2.374 |
| S10 | fourth lens | aspherical surface | −2.327 | 1.189 | glass | 1.54 | 56 | 1.148 | 1.456 |
| S11 | | aspherical surface | −1.163 | 0.260 | | | | 1.320 | −1.359 |
| S12 | fifth lens | aspherical surface | 1.583 | 0.257 | glass | 1.66 | 20.4 | 1.436 | −30.155 |
| S13 | | aspherical surface | 0.920 | 0.683 | | | | 1.627 | −8.692 |

Wherein, EFL is the effective focal length of the optical imaging lens 10, FNO is the F-number of the optical imaging lens 10, and FOV is the field of view of the optical imaging lens 10.

It should be noted that the object surface and the image surface of each lens of the optical imaging lens 10 are aspherical. The aspherical equation of each aspherical surface as follows:

$$Z = \frac{cr^2}{1 + \sqrt{1 - (k+1)c^2 r^2}} + Ar^4 + Br^6 + Cr^8 + Dr^{10} + Er^{12} + Fr^{14} + Gr^{16} + \ldots$$

Wherein, Z represents a height of the surface parallel to Z axis, R represents a radial distance starting from the vertex of the surface, C represents the curvature at the vertex, K represents the conic constant, and K4, K6, K8, K10, K12 and K14 represent aspherical coefficients of fourth-order, sixth-order, eighth-order, tenth-order, and twelfth-order, respectively. The aspherical coefficients are shown in Table 2.

TABLE 2

First embodiment

| surface | K2 | K4 | K6 | K8 | K10 | K12 | K14 |
|---|---|---|---|---|---|---|---|
| S3 | 0.000E+00 | 1.270E−01 | −9.700E−02 | 5.100E−02 | −1.600E−02 | 2.333E−03 | −1.020E−04 |
| S4 | 0.000E+00 | 4.450E−01 | −1.610E+00 | 7.308E+00 | −1.975E+01 | 2.805E+01 | −1.616E+01 |
| S6 | 0.000E+00 | −7.800E−02 | 1.040E−01 | −1.007E+00 | 2.117E+00 | −2.761E+00 | 7.140E−01 |
| S7 | 0.000E+00 | 3.501E−03 | 2.280E−01 | −5.070E−01 | 3.920E−01 | −1.330E−01 | 7.060E−03 |
| S8 | 0.000E+00 | −4.110E−01 | 7.830E−01 | −8.690E−01 | 2.880E−01 | 2.010E−01 | −1.480E−01 |
| S9 | 0.000E+00 | −4.630E−01 | 7.780E−01 | −7.700E−01 | 4.310E−01 | −1.170E−01 | 7.938E−03 |
| S10 | 0.000E+00 | 3.330E−01 | −3.320E−01 | 2.840E−01 | 1.600E−02 | −2.010E−01 | 1.260E−01 |
| S11 | 0.000E+00 | 9.400E−02 | −8.435E−04 | −4.600E−02 | 1.300E−02 | 3.300E−02 | −2.300E−02 |
| S12 | 0.000E+00 | −2.040E−01 | 1.210E−01 | −6.000E−02 | 1.800E−02 | −5.662E−04 | −8.794E−04 |
| S13 | 0.000E+00 | −1.620E−01 | 1.110E−01 | −5.200E−02 | 1.600E−02 | −3.149E−03 | 3.281E−04 |

Figure 2:
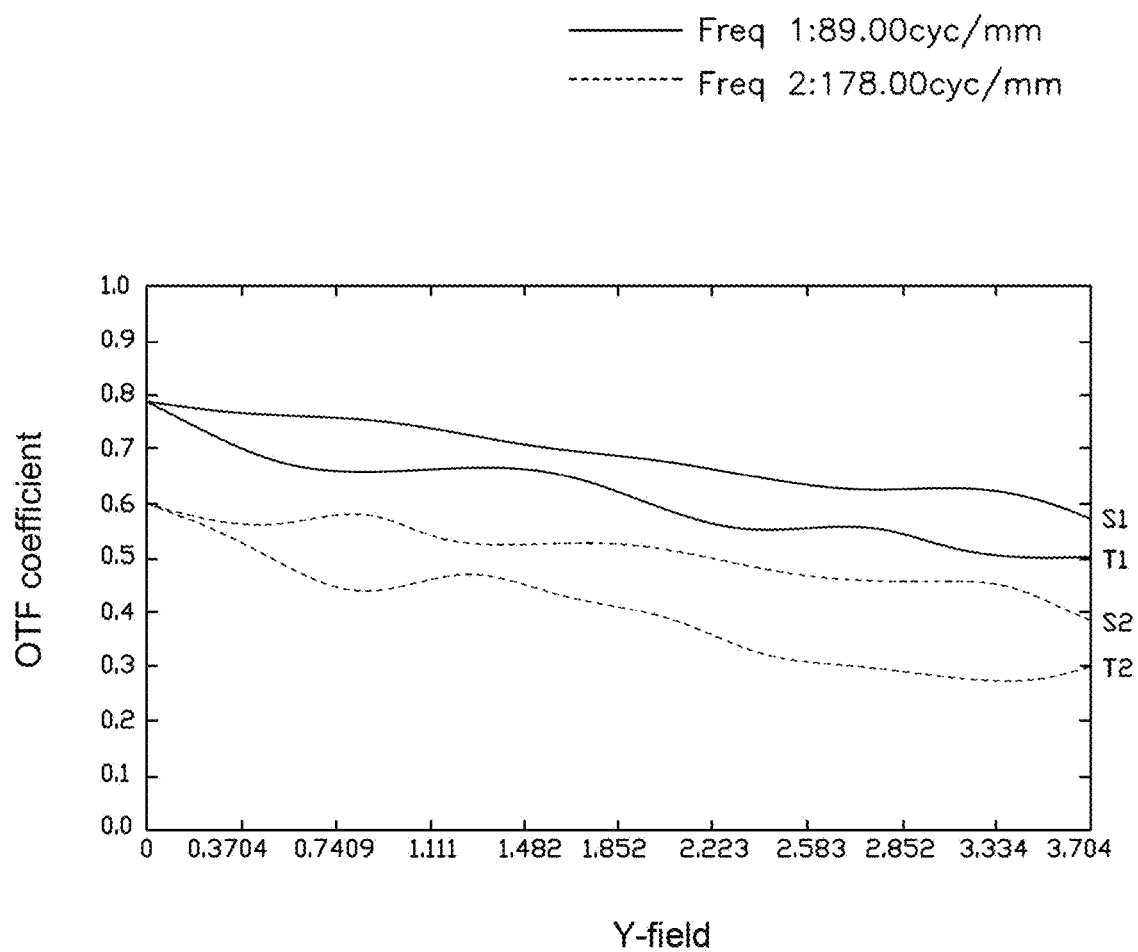
FIG. 2 is a diagram of relative illuminance of the optical imaging lens of FIG. 1.
Figure 3:
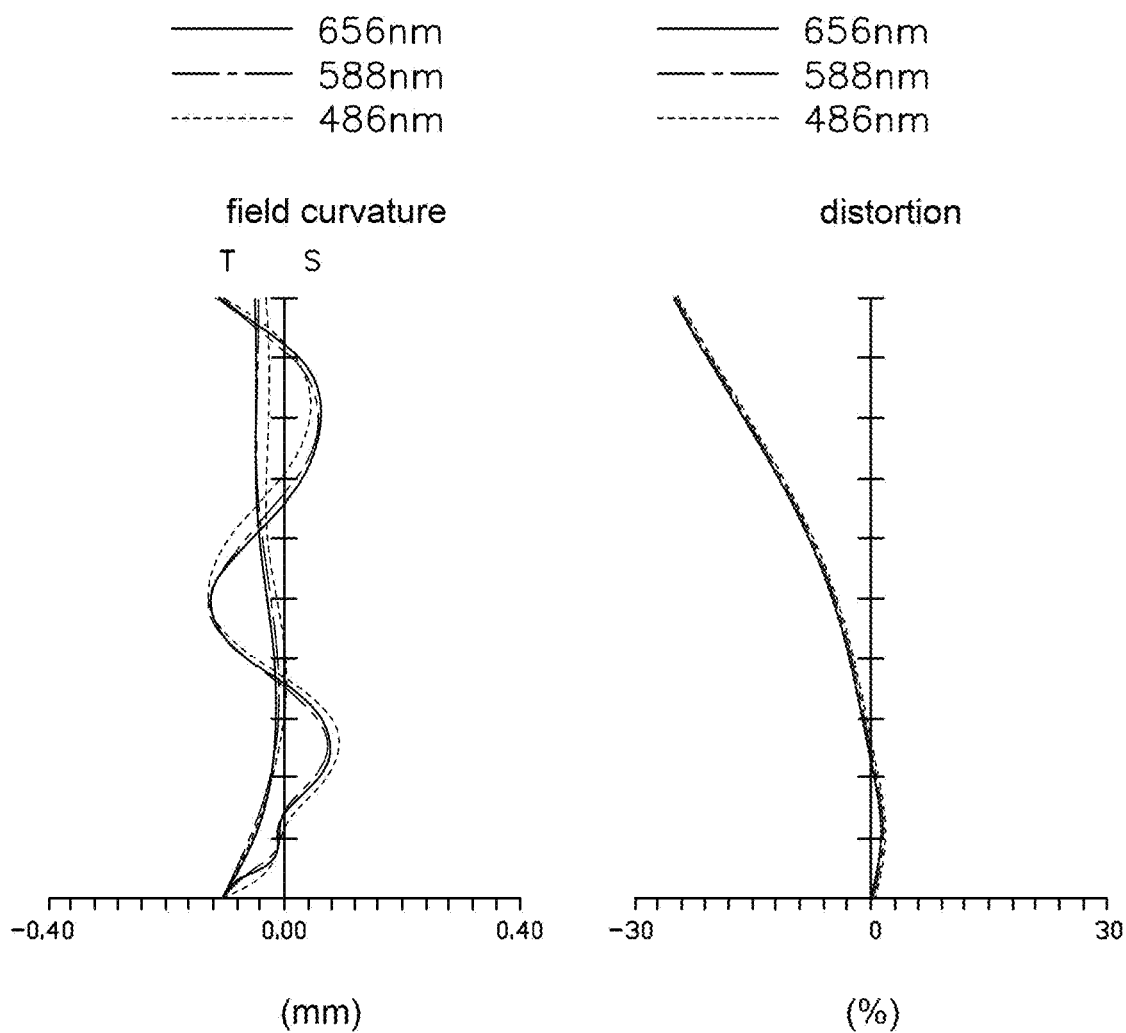
FIG. 3 shows field curvatures and distortions of the optical imaging lens of FIG. 1.

In the embodiment, the relative illuminances, the field curvatures, and the distortions of the optical imaging lens 10 are shown in FIG. 2 and FIG. 3. In FIG. 2, the relative illuminance can be maintained at a high level, and all relative illuminances are above 0.3. In FIG. 3, S curve and T curve are the sagittal field curvature and the meridional field curvature of the optical imaging lens 100, respectively. Each of the sagittal field curvature and the meridional field curvature are controlled in a range of −0.05 mm to 0.05 mm. The distortions are controlled to be in a range of 0% and 15%.

Second Embodiment

Figure 4:
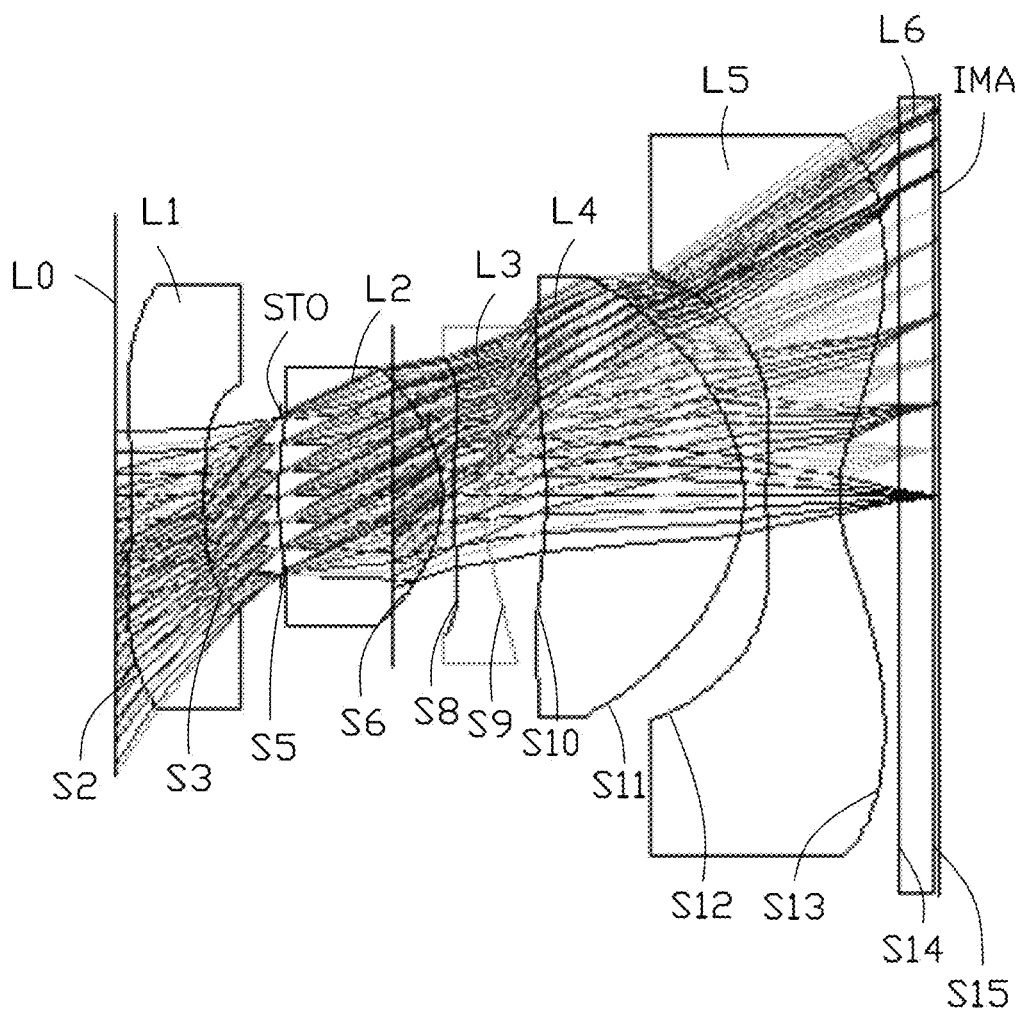
FIG. 4 is a diagrammatic view of a second embodiment of an optical imaging lens according to the present disclosure.

Referring to FIG. 4, the optical imaging lens 10, from the object side to the image side, includes a first lens L1, a stop STO, a second lens L2, a third lens L3, a fourth lens L4, a fifth lens L5, and an infrared filter L6.

The object surface S2 of the first lens L1 is concave near the optical axis, and the image surface S3 of the first lens L1 is concave near the optical axis. The object surface S5 of the second lens L2 is convex near the optical axis, and the image surface S6 of the second lens L2 is convex near the optical axis. The object surface S8 of the third lens L3 is convex near the optical axis, and the image surface S9 of the third lens L3 is concave near the optical axis. The object surface S10 of the fourth lens L4 is concave near the optical axis, and the image surface S11 of the fourth lens L4 is convex near the optical axis. The object surface S12 of the fifth lens L5 is convex near the optical axis, the image surface S13 of the fifth lens L5 is concave near the optical axis. Each of the object surface S12 and the image surface S13 of the fifth lens L5 has at least one inflection point.

When the optical imaging lens 10 is used, rays from the object side enter the optical imaging lens 10, successively pass through the first lens L1, the stop STO, the second lens L2, the third lens L3, the fourth lens L4, the fifth lens L5, and the infrared filter L6, and finally converge on the image plane IMA.

Table 3 shows characteristics of the optical imaging lens 10. The reference wavelength of focal length, refractive index, and Abbe number is 588 nm, and the units of radius of curvature, thickness, and semi-diameter are in millimeters (mm).

TABLE 3

Second embodiment
EFL = 1.884 mm, FNO = 2.3, FOV = 118.97°

| surface | lens | type of surface | radius of curvature | thickness | material | refractive index | Abbe number | semi-diameter | conic constant |
|---|---|---|---|---|---|---|---|---|---|
| S1 | | standard surface | infinite | 0.100 | | | | 1.760 | 0.000 |
| S2 | first lens | aspherical surface | −2.982 | 0.451 | glass | 1.54 | 56 | 1.332 | −33.111 |
| S3 | | aspherical surface | 6.639 | 0.474 | | | | 0.709 | 85.162 |
| STO | | standard surface | infinite | −0.008 | | | | 0.489 | 0.000 |
| S5 | second lens | aspherical surface | 2.914 | 1.026 | glass | 1.54 | 20.4 | 0.539 | 9.135 |
| S6 | | aspherical surface | −0.861 | −0.315 | | | | 0.811 | −0.964 |
| S7 | | standard surface | infinite | 0.380 | | | | 0.820 | 0.000 |
| S8 | third lens | aspherical surface | 2.197 | 0.187 | glass | 1.66 | 20.4 | 0.873 | −10.655 |
| S9 | | aspherical surface | 1.202 | 0.402 | | | | 1.055 | −2.244 |
| S10 | fourth lens | aspherical surface | −2.837 | 1.238 | glass | 1.54 | 56 | 1.237 | 2.097 |
| S11 | | aspherical surface | −1.043 | 0.144 | | | | 1.382 | −0.930 |
| S12 | fifth lens | aspherical surface | 2.641 | 0.456 | glass | 1.66 | 20.4 | 1.403 | −50.496 |
| S13 | | aspherical surface | 0.827 | 0.374 | | | | 2.262 | −5.152 |
| S14 | infrared filter | standard surface | infinite | 0.210 | glass | 1.52 | 64.2 | 2.432 | 0.000 |
| S15 | | standard surface | infinite | 0.038 | | | | 2.494 | 0.000 |
| IMA | | standard surface | infinite | | | | | 2.512 | 0.000 |

Wherein, EFL is the effective focal length of the optical imaging lens 10, FNO is the F-number of the optical imaging lens 10, and FOV is the field of view of the optical imaging lens 10.

Table 4 shows the aspherical coefficients of the object surface and the image surface of each lens of the optical imaging lens 10.

TABLE 4

Second embodiment

| surface | K2 | K4 | K6 | K8 | K10 | K12 | K14 |
|---|---|---|---|---|---|---|---|
| S3 | 0.000E+00 | 1.720E−01 | −9.500E−02 | 5.200E−02 | −1.600E−02 | 3.372E−03 | −1.243E−03 |
| S4 | 0.000E+00 | 6.270E−01 | −1.495E+00 | 7.431E+00 | −1.990E+01 | 3.118E+01 | −2.223E+01 |
| S6 | 0.000E+00 | −2.100E−02 | −6.200E−02 | −1.319E+00 | 2.484E+00 | 4.669E+00 | −1.439E+01 |
| S7 | 0.000E+00 | −1.100E−02 | 1.680E−01 | −6.070E−01 | 5.820E−01 | −2.990E−01 | −9.300E−02 |
| S8 | 0.000E+00 | −4.800E−01 | 7.240E−01 | −8.820E−01 | 2.250E−01 | 2.930E−01 | −3.090E−01 |

TABLE 4-continued

Second embodiment

| surface | K2 | K4 | K6 | K8 | K10 | K12 | K14 |
|---------|------|------|------|------|------|------|------|
| S9 | 0.000E+00 | −4.690E−01 | 7.750E−01 | −7.750E−01 | 4.280E−01 | −1.080E−01 | 4.494E−03 |
| S10 | 0.000E+00 | 2.560E−01 | −3.320E−01 | 2.920E−01 | 1.700E−02 | −2.010E−01 | 1.250E−01 |
| S11 | 0.000E+00 | 4.900E−02 | −1.100E−02 | −4.300E−02 | 8.698E−003 | 3.000E−02 | −2.300E−02 |
| S12 | 0.000E+00 | −3.530E−01 | 1.310E−01 | −4.400E−02 | 1.300E−02 | −2.736E−03 | −2.736E−04 |
| S13 | 0.000E+00 | −1.640E−01 | 1.130E−01 | −5.300E−02 | 1.600E−02 | −3.091E−03 | 3.394E−04 |

Figure 5:
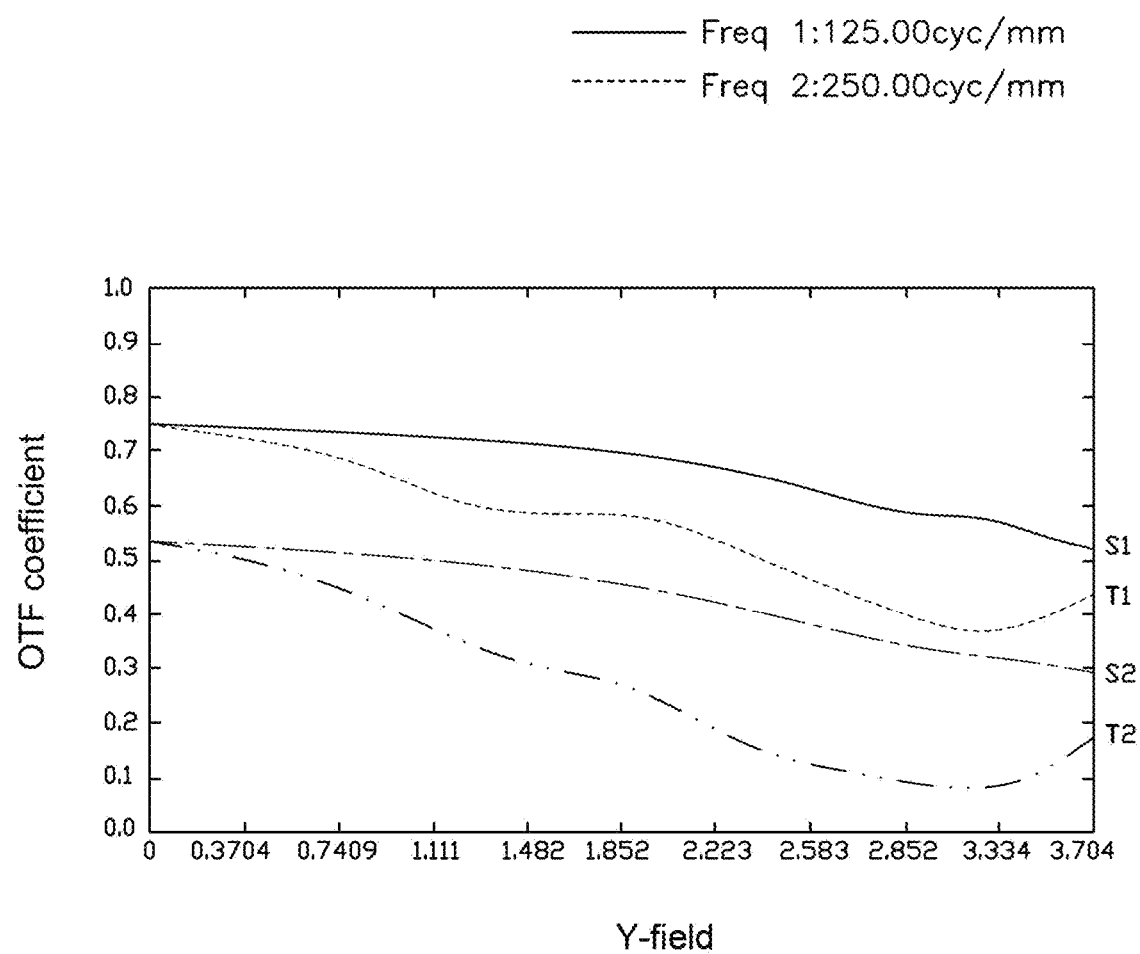
FIG. 5 is a diagram of relative illuminance of the optical imaging lens of FIG. 4.
Figure 6:
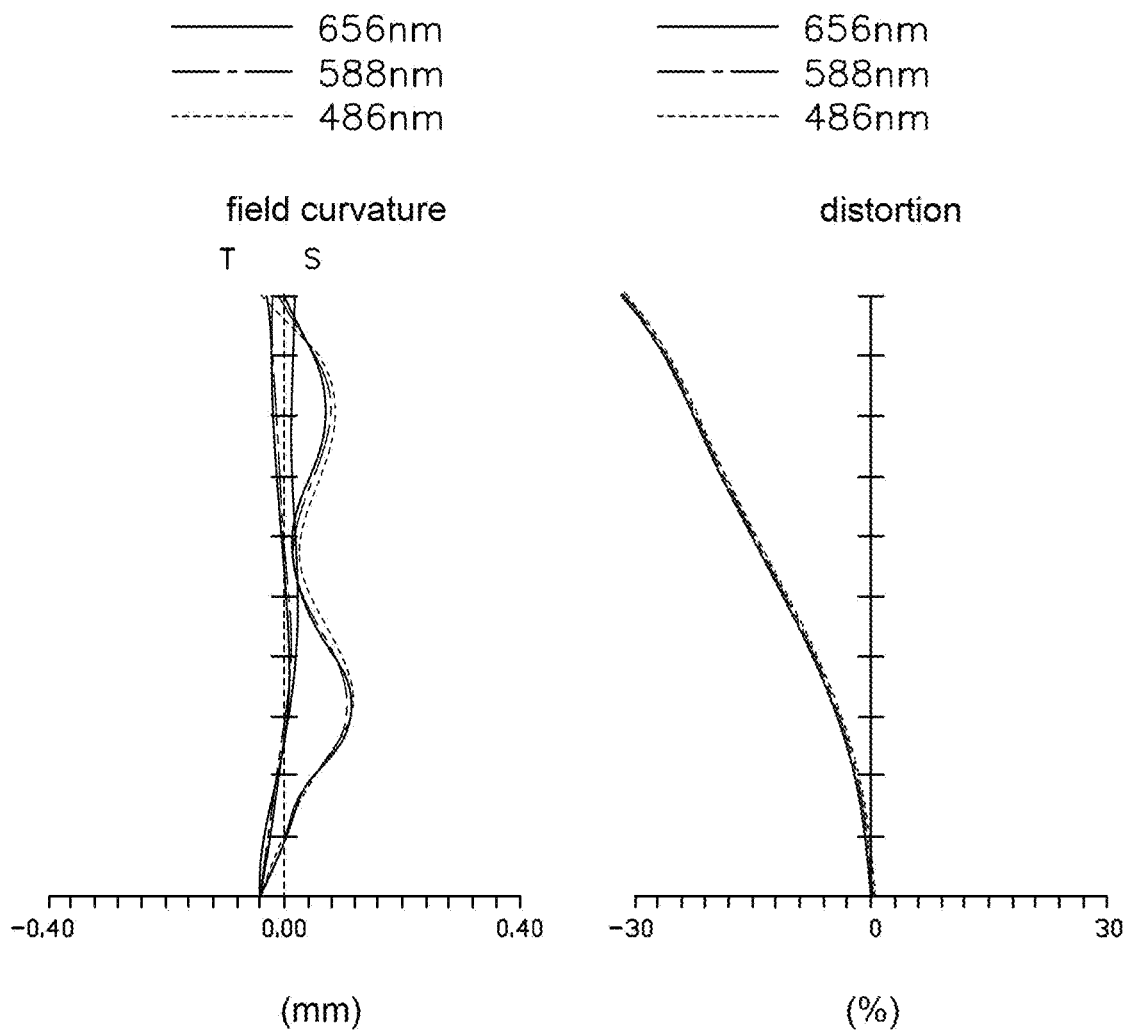
FIG. 6 shows field curvatures and distortions of the optical imaging lens of FIG. 4.

In the embodiment, the relative illuminances, the field curvatures, and the distortions of the optical imaging lens 10 are shown in FIG. 5 and FIG. 6. In FIG. 5, the relative illuminance can be maintained at a high level, and all relative illuminances are above 0.3. In FIG. 6, S curve and T curve are the sagittal field curvature and the meridional field curvature of the optical imaging lens 100 respectively. Each of the sagittal field curvature and the meridional curvature is controlled in a range of −0.05 mm to 0.05 mm. The distortions are controlled in a range of 0% and 15%.

Third Embodiment

Figure 7:
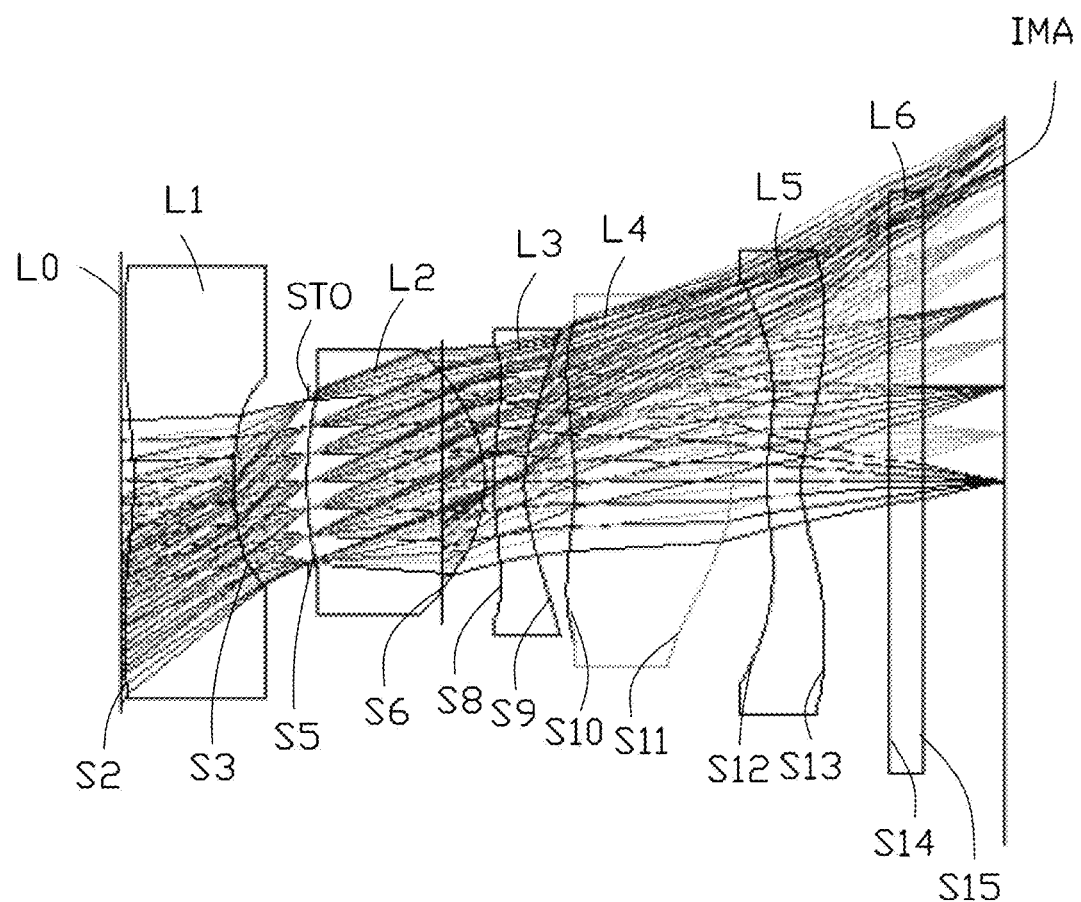
FIG. 7 is a diagrammatic view of a third embodiment of an optical imaging lens according to the present disclosure.

Referring to FIG. 7, the optical imaging lens 10, from the object side to the image side, includes a first lens L1, a stop STO, a second lens L2, a third lens L3, a fourth lens L4, a fifth lens L5, and an infrared filter L6.

The object surface S2 of the first lens L1 is concave near the optical axis, and the image surface S3 of the first lens L1 is concave near the optical axis. The object surface S5 of the second lens L2 is convex near the optical axis, and the image surface S6 of the second lens L2 is convex near the optical axis. The object surface S8 of the third lens L3 is convex near the optical axis, and the image surface S9 of the third lens L3 is concave near the optical axis. The object surface S10 of the fourth lens L4 is concave near the optical axis, and the image surface S11 of the fourth lens L4 is convex near the optical axis. The object surface S12 of the fifth lens L5 is convex near the optical axis, the image surface S13 of the fifth lens L5 is concave near the optical axis. Each of the object surface S12 and the image surface S13 of the fifth lens L5 has at least one inflection point.

When the optical imaging lens 10 is used, rays from the object side enter the optical imaging lens 10, successively pass through the first lens L1, the stop STO, the second lens L2, the third lens L3, the fourth lens L4, the fifth lens L5, and the infrared filter L6, and finally converge on the image plane IMA.

Table 5 shows characteristics of the optical imaging lens 10. The reference wavelength of focal length, refractive index, and Abbe number is 588 nm, and the units of radius of curvature, thickness and semi-diameter are in millimeters (mm).

TABLE 5

Third embodiment
EFL = 3.86 mm, FNO = 2.39, FOV = 119.76°

| surface | lens | type of surface | radius of curvature | thickness | material | refractive index | Abbe number | semi-diameter | conic constant |
|---------|------|-----------------|---------------------|-----------|----------|------------------|-------------|---------------|----------------|
| OBJ | | standard surface | infinite | 3747.468 | | | | 6469.18 | 0.000 |
| S1 | | standard surface | infinite | 0.059 | | | | 1.020 | 0.000 |
| S2 | first lens | aspherical surface | −1.736 | 0.444 | glass | 1.54 | 56 | 0.958 | −11.492 |
| S3 | | aspherical surface | 2.004 | 0.329 | | | | 0.462 | 17.160 |
| STO | | standard surface | infinite | −0.0047 | | | | 0.360 | 0.000 |
| S5 | second lens | aspherical surface | 1.715 | 0.789 | glass | 1.54 | 56 | 0.416 | 13.637 |
| S6 | | aspherical surface | −0.566 | −0.186 | | | | 0.588 | −1.276 |
| S7 | | standard surface | infinite | 0.225 | | | | 0.485 | 0.000 |
| S8 | third lens | aspherical surface | 1.188 | 0.136 | glass | 1.66 | 20.4 | 0.609 | −10.257 |
| S9 | | aspherical surface | 0.660 | 0.226 | | | | 0.680 | −2.371 |
| S10 | fourth lens | aspherical surface | −1.379 | 0.698 | glass | 1.54 | 56 | 0.722 | 1.459 |
| S11 | | aspherical surface | −0.689 | 0.154 | | | | 0.825 | −1.333 |
| S12 | fifth lens | aspherical surface | 0.936 | 0.152 | glass | 1.66 | 20.4 | 0.898 | −30.688 |
| S13 | | aspherical surface | 0.546 | 0.394 | | | | 1.027 | −8.672 |
| S14 | infrared filter | standard surface | infinite | 0.150 | glass | 1.52 | 64.2 | 1.216 | 0.000 |

TABLE 5-continued

Third embodiment
EFL = 3.86 mm, FNO = 2.39, FOV = 119.76°

| surface | lens | type of surface | radius of curvature | thickness | material | refractive index | Abbe number | semi-diameter | conic constant |
|---|---|---|---|---|---|---|---|---|---|
| S15 | | standard surface | infinite | 0.363 | | | | 1.290 | 0.000 |
| IMA | | standard surface | infinite | | | | | 1.615 | 0.000 |

Wherein, EFL is the effective focal length of the optical imaging lens 10, FNO is the F-number of the optical imaging lens 10, and FOV is the field of view of the optical imaging lens 10.

Table 6 shows the aspherical coefficients of the object surface and the image surface of each lens of the optical imaging lens 10.

TABLE 6

Third embodiment

| surface | K2 | K4 | K6 | K8 | K10 | K12 | K14 |
|---|---|---|---|---|---|---|---|
| S3 | 0.000E+00 | 6.100E−01 | −1.336E+00 | 2.002E+00 | −1.777E+00 | 7.640E−01 | −9.300E−02 |
| S4 | 0.000E+00 | 2.146E+00 | −2.211E+01 | 2.868E+02 | −2.209E+03 | 8.963E+03 | −1.470E+04 |
| S6 | 0.000E+00 | −3.720E−01 | 1.509E+00 | −3.914E+01 | 2.375E+02 | −8.863E+02 | 5.846E+02 |
| S7 | 0.000E+00 | 1.700E−02 | 3.142E+00 | −1.984E+01 | 4.394E+01 | −4.234E+01 | 7.199E+00 |
| S8 | 0.000E+00 | −1.986E+00 | 1.076E+01 | −3.409E+01 | 3.229E+01 | 6.440E+01 | −1.345E+02 |
| S9 | 0.000E+00 | −2.231E+00 | 1.070E+01 | −3.022E+01 | 4.829E+01 | −3.723E+01 | 7.239E+00 |
| S10 | 0.000E+00 | 1.608E+00 | −4.562E+00 | 1.114E+01 | 1.806E+01 | −6.418E+01 | 1.145E+02 |
| S11 | 0.000E+00 | 4.450E−01 | −1.800E−02 | −1.791E+00 | 1.427E+00 | 1.054E+01 | −2.107E+01 |
| S12 | 0.000E+00 | −9.860E−01 | 1.672E+00 | −2.337E+00 | 1.996E+00 | −1.860E−01 | −8.040E−01 |
| S13 | 0.000E+00 | −7.810E−01 | 1.522E+00 | −2.038E+00 | 1.817E+00 | −1.006E+00 | 2.990E−01 |

Figure 8:
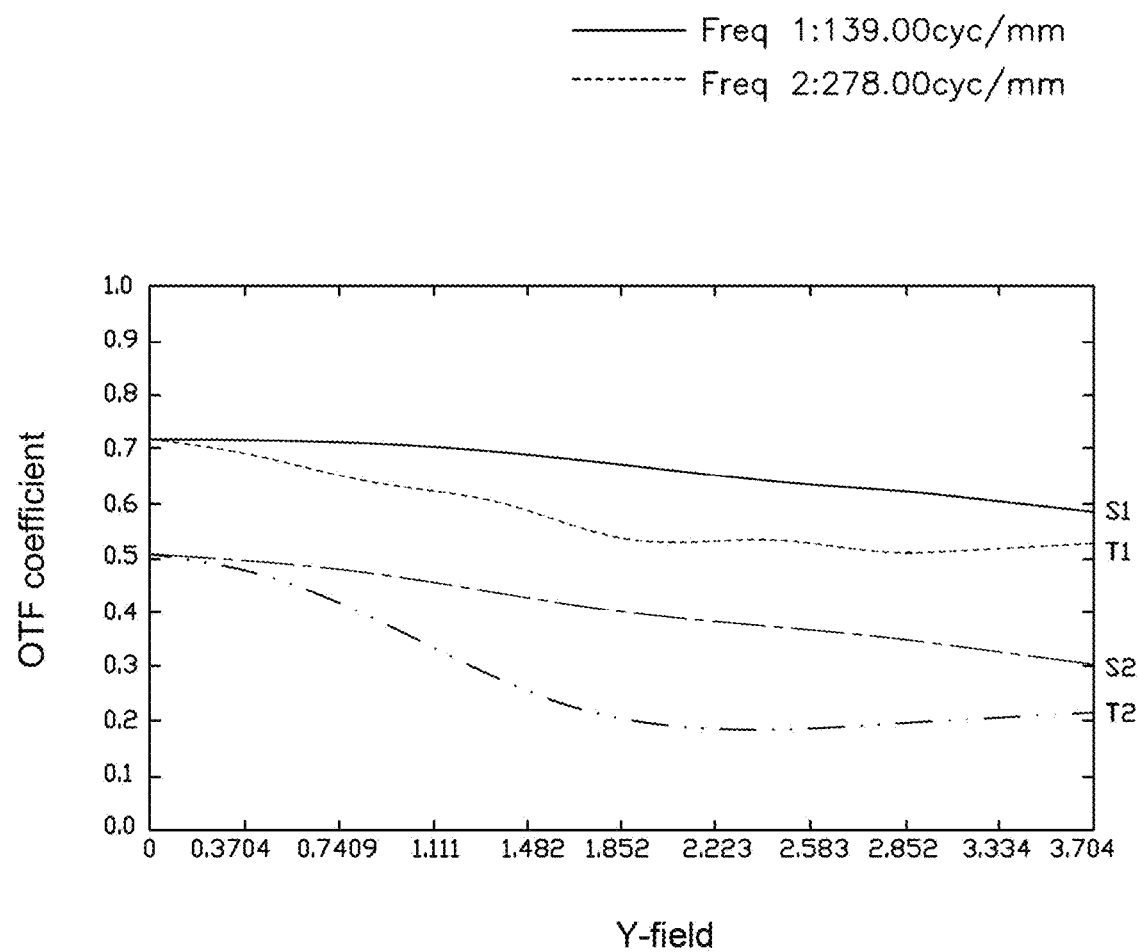
FIG. 8 is a diagram of relative illuminance of the optical imaging lens of FIG. 7.
Figure 9:
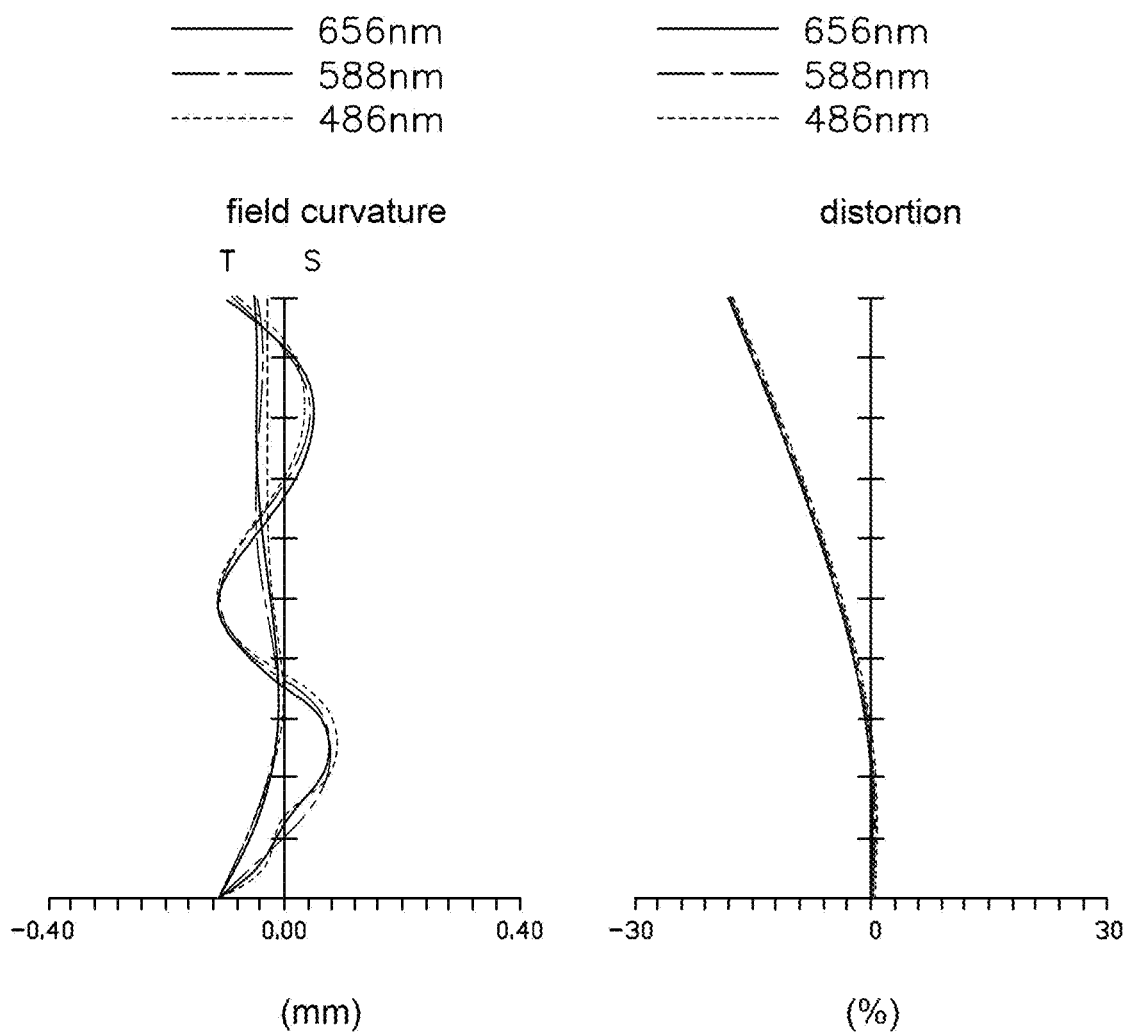
FIG. 9 shows field curvatures and distortions of the optical imaging lens of FIG. 7.

In the embodiment, the relative illuminances, the field curvatures, and the distortions of the optical imaging lens 10 are shown in FIG. 8 and FIG. 9. In FIG. 8, the relative illuminance can be maintained at a high level, and all relative illuminances are above 0.3. In FIG. 9, S curve and T curve are the sagittal field curvature and the meridional field curvature, respectively. Each of the sagittal field curvature and the meridional field curvature are controlled is controlled in a range of −0.05 mm to 0.05 mm. The distortions are controlled in a range of 0% and 15%.

Fourth Embodiment

Figure 10:
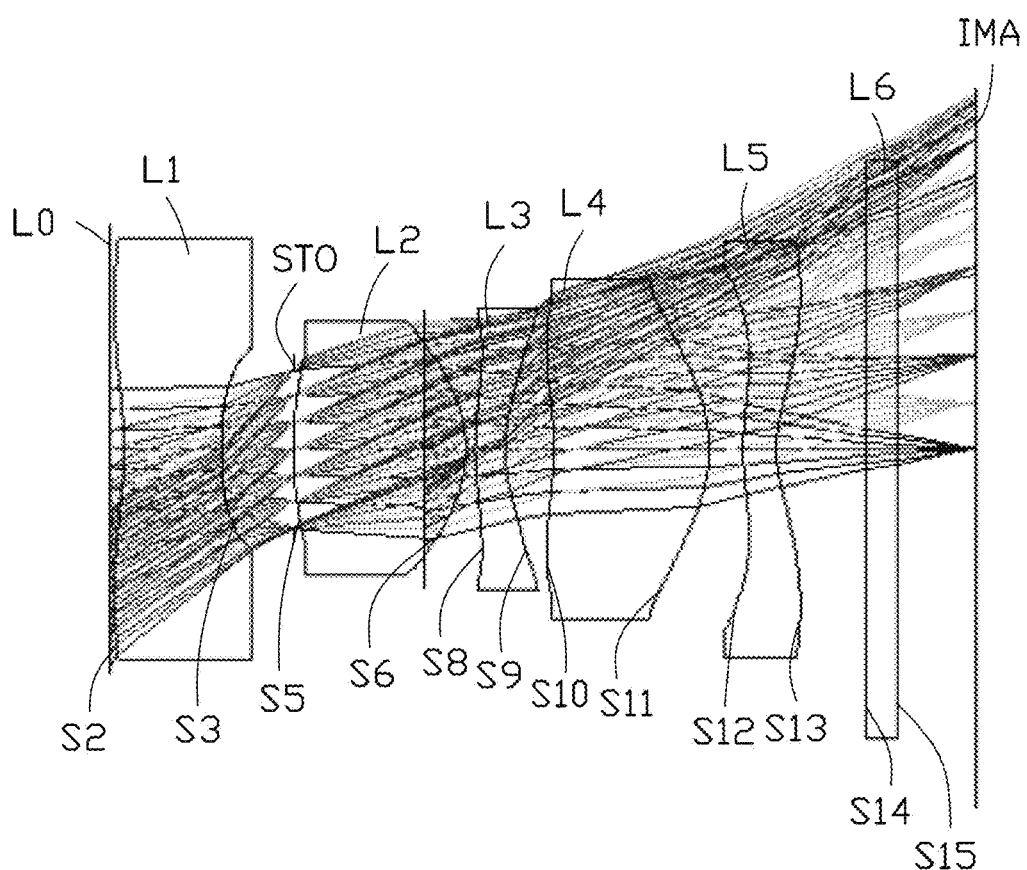
FIG. 10 is a diagrammatic view of a fourth embodiment of an optical imaging lens according to the present disclosure.

Referring to FIG. 10, the optical imaging lens 10, from the object side to the image side, includes a first lens L1, a stop STO, a second lens L2, a third lens L3, a fourth lens L4, a fifth lens L5, and an infrared filter L6.

The object surface S2 of the first lens L1 is concave near the optical axis, and the image surface S3 of the first lens L1 is concave near the optical axis. The object surface S5 of the second lens L2 is convex near the optical axis, and the image surface S6 of the second lens L2 is convex near the optical axis. The object surface S8 of the third lens L3 is convex near the optical axis, and the image surface S9 of the third lens L3 is concave near the optical axis. The object surface S10 of the fourth lens L4 is concave near the optical axis, and the image surface S11 of the fourth lens L4 is convex near the optical axis. The object surface S12 of the fifth lens L5 is convex near the optical axis, the image surface S13 of the fifth lens L5 is concave near the optical axis. Each of the object surface S12 and the image surface S13 of the fifth lens L5 has at least one inflection point.

When the optical imaging lens 10 is used, rays from the object side enter the optical imaging lens 10, successively pass through the first lens L1, the stop STO, the second lens L2, the third lens L3, the fourth lens L4, the fifth lens L5, and the infrared filter L6, and finally converge on the image plane IMA.

Table 7 shows characteristics of the optical imaging lens 10. The reference wavelength of focal length, refractive index, and Abbe number is 588 nm, and the units of radius of curvature, thickness, and semi-diameter are in millimeters (mm).

TABLE 7

Fourth embodiment
EFL = 3.86 mm, FNO = 2.4, FOV = 120.03°

| surface | lens | type of surface | radius of curvature | thickness | material | refractive index | Abbe number | semi-diameter | conic constant |
|---|---|---|---|---|---|---|---|---|---|
| OBJ | | standard surface | infinite | 5000.000 | | | | 8665.589 | 0.000 |
| S1 | | standard surface | infinite | 0.059 | | | | 1.013 | 0.000 |
| S2 | first lens | aspherical surface | −1.712 | 0.441 | glass | 1.54 | 56 | 0.953 | −11.522 |

TABLE 7-continued

Fourth embodiment
EFL = 3.86 mm, FNO = 2.4, FOV = 120.03°

| surface | lens | type of surface | radius of curvature | thickness | material | refractive index | Abbe number | semi-diameter | conic constant |
|---|---|---|---|---|---|---|---|---|---|
| S3 | | aspherical surface | 1.996 | 0.330 | | | | 0.460 | 17.136 |
| STO | | standard surface | infinite | -0.0047 | | | | 0.357 | 0.000 |
| S5 | second lens | aspherical surface | 1.705 | 0.783 | glass | 1.54 | 56 | 0.413 | 13.900 |
| S6 | | aspherical surface | -0.563 | -0.185 | | | | 0.573 | -1.285 |
| S7 | | standard surface | infinite | 0.224 | | | | 0.483 | 0.000 |
| S8 | third lens | aspherical surface | 1.180 | 0.136 | glass | 1.66 | 20.4 | 0.589 | -10.067 |
| S9 | | aspherical surface | 0.656 | 0.225 | | | | 0.636 | -2.389 |
| S10 | fourth lens | aspherical surface | -0.370 | 0.701 | glass | 1.54 | 56 | 0.672 | 1.457 |
| S11 | | aspherical surface | -0.685 | 0.153 | | | | 0.771 | -1.324 |
| S12 | fifth lens | aspherical surface | 0.928 | 0.152 | glass | 1.66 | 20.4 | 0.832 | -30.771 |
| S13 | | aspherical surface | 0.541 | 0.400 | | | | 0.946 | -8.551 |
| S14 | infrared filter | standard surface | infinite | 0.150 | glass | 1.52 | 64.2 | 1.233 | 0.000 |
| S15 | | standard surface | infinite | 0.349 | | | | 1.308 | 0.000 |
| IMA | | standard surface | infinite | | | | | 1.630 | 0.000 |

Where EFL is the effective focal length of the optical imaging lens 10, FNO is the F-number of the optical imaging lens 10, and FOV is the field of view of the optical imaging lens 10.

Table 9 shows the values of (V5−V4)/(TL5−TL4), FOV/FNO, FOV/TL4, FOV/TL5, Imgh/EPD, TTL/Imgh, V4/V5, and EFL in the optical imaging lens 10 of the first to fourth embodiments.

TABLE 8

Fourth embodiment

| surface | K2 | K4 | K6 | K8 | K10 | K12 | K14 |
|---|---|---|---|---|---|---|---|
| S3 | 0.000E+00 | 6.200E-01 | -1.373E+00 | 2.080E+00 | -1.868E+00 | 8.120E-01 | -1.000E-01 |
| S4 | 0.000E+00 | 2.195E+00 | -2.276E+01 | 2.981E+02 | -2.319E+03 | 9.524E+03 | -1.579E+04 |
| S6 | 0.000E+00 | -3.840E-01 | 1.513E+00 | -4.110E+01 | 2.471E+02 | -9.404E+02 | 8.567E+02 |
| S7 | 0.000E+00 | 2.000E-02 | 3.242E+00 | -2.059E+01 | 4.625E+01 | -4.471E+01 | 8.460E+00 |
| S8 | 0.000E+00 | -2.016E+00 | 1.107E+01 | -3.541E+01 | 3.399E+01 | 6.955E+01 | -1.442E+02 |
| S9 | 0.000E+00 | -2.269E+00 | 1.100E+01 | -3.141E+01 | 5.075E+01 | -3.955E+01 | 7.812E+00 |
| S10 | 0.000E+00 | 1.635E+00 | -4.689E+00 | 1.158E+01 | 1.901E+01 | -6.819E+01 | 1.231E+02 |
| S11 | 0.000E+00 | 4.550E-01 | -1.700E-02 | -1.859E+00 | 1.502E+00 | 1.120E+01 | -2.264E+01 |
| S12 | 0.000E+00 | -1.002E+00 | 1.714E+00 | -2.433E+00 | 2.095E+00 | -1.990E-01 | -8.640E-01 |
| S13 | 0.000E+00 | -7.850E-01 | 1.582E+00 | -2.121E+00 | 1.909E+00 | -1.068E+00 | 3.210E-01 |

Figure 11:
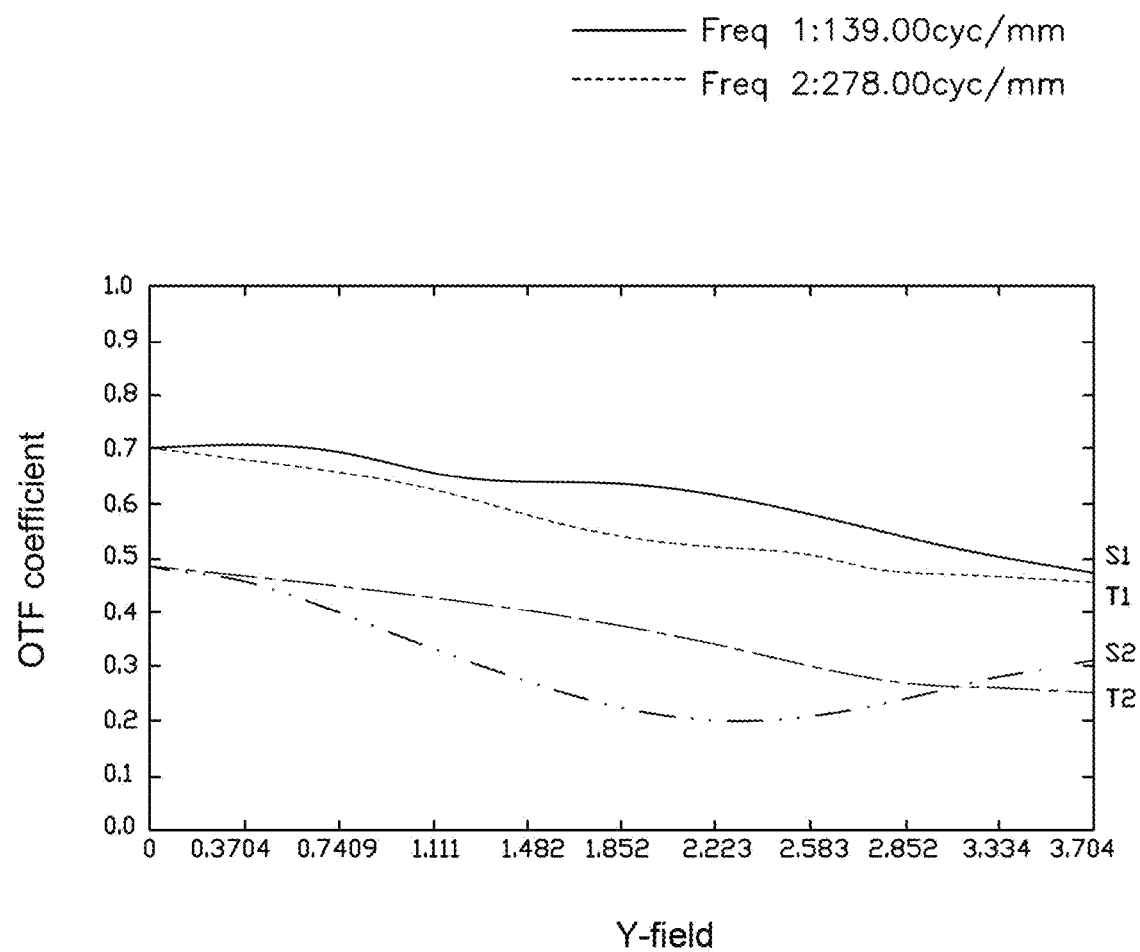
FIG. 11 is a diagram of relative illuminance of the optical imaging lens of FIG. 10.
Figure 12:
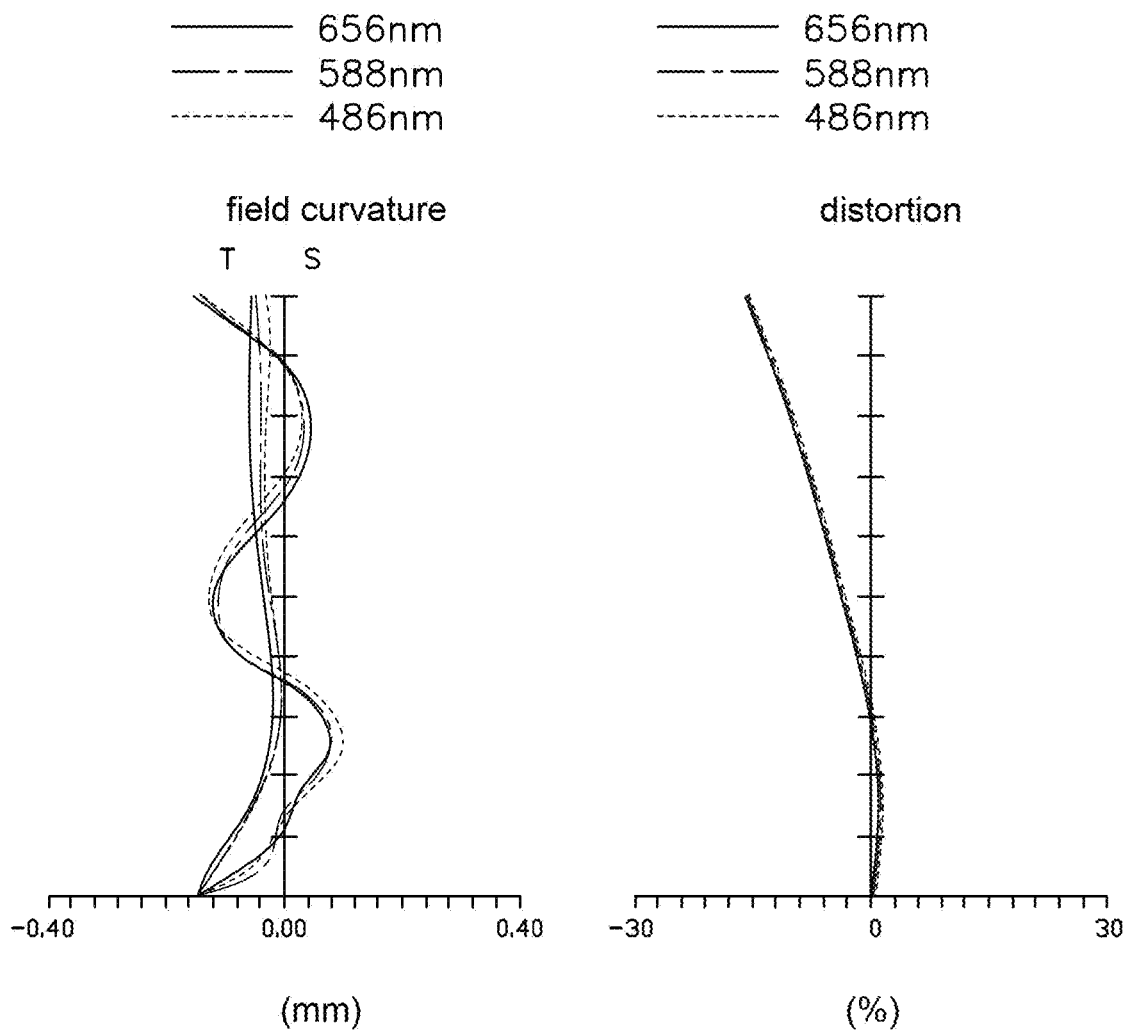
FIG. 12 shows of field curvatures and distortions of the optical imaging lens of FIG. 10.

In the embodiment, the relative illuminances, the field curvatures, and the distortions of the optical imaging lens 10 are shown in FIG. 11 and FIG. 12. In FIG. 11, the relative illuminance can be maintained at a high level, and all relative illuminances are above 0.3. In FIG. 12, S curve and T curve are the sagittal field curvature and the meridional field curvature, respectively. Each of the sagittal field curvature and the meridional field curvature are controlled is controlled in a range of −0.05 mm to 0.05 mm. The distortions are controlled in a range of 0% and 15%.

TABLE 9

| | (V5 − V4)/(TL5 − TL4) | FOV/FNO | FOV/TL4 | FOV/TL5 |
|---|---|---|---|---|
| First embodiment | 24.569 | 49.57 | 36.833 | 66.8 |
| Second embodiment | 25.76 | 51.726 | 48.362 | 110.362 |
| Third embodiment | 41.784 | 50.109 | 62.669 | 113.088 |
| Fourth embodiment | 41.686 | 50.012 | 63.008 | 114.206 |

TABLE 9-continued

|  | Imgh/epd | TTL/Imgh | V4/V5 | EFL |
|---|---|---|---|---|
| First embodiment | 3.863 | 1.792 | 2.754 | 2.183 |
| Second embodiment | 3.72 | 1.675 | 2.754 | 1.884 |
| Third embodiment | 1.577 | 4.386 | 2.754 | 3.86 |
| Fourth embodiment | 1.594 | 4.375 | 2.754 | 3.86 |

Figure 13:
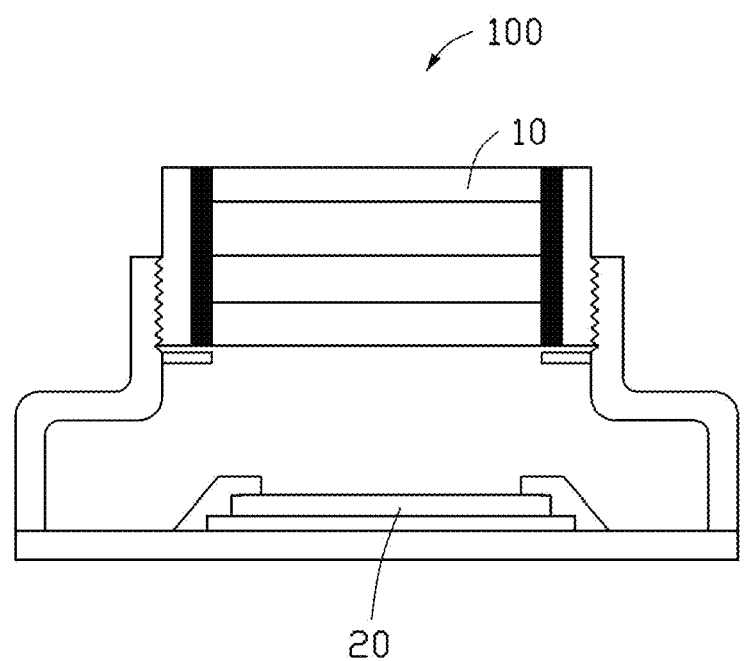
FIG. 13 is a diagrammatic view of an embodiment of an imaging module containing the optical imaging lens according to the present disclosure.

Referring to FIG. 13, an embodiment of an imaging module 100 is further provided, which includes the optical imaging lens 10 and an optical sensor 20. The optical sensor 20 is arranged on the image side of the optical imaging lens 10. The optical sensor 20 can be a CMOS (complementary metal oxide semiconductor) sensor or a charge coupled device (CCD).

Figure 14:
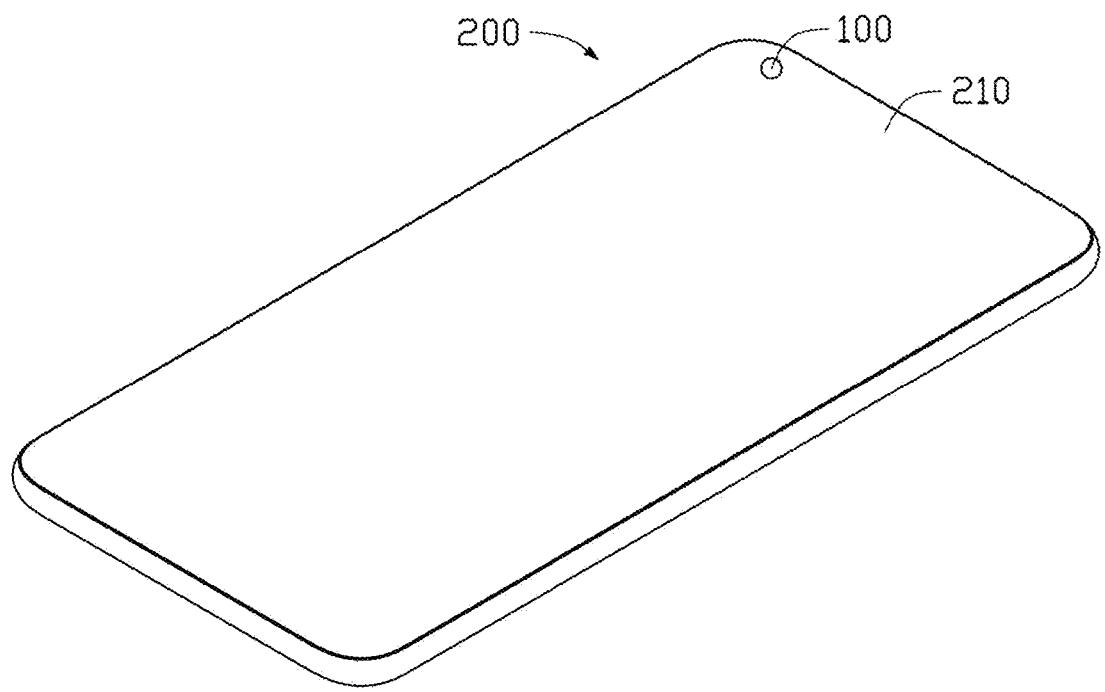
FIG. 14 is a diagrammatic view of an embodiment of an electronic device containing the imaging module according to the present disclosure.

Referring to FIG. 14, an embodiment of an electronic device 200 is further provided, which includes the imaging module 100 and a housing 210. The imaging module 100 is mounted on the housing 210. The electronic device 200 can be a tachograph, a smart phone, a tablet computer, a notebook computer, an e-book reader, a portable multimedia player (PMP), a portable telephone, a video telephone, a digital camera, a mobile medical device, a wearable device, etc.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical imaging lens, from an object side to an image side, composed of:
   a first lens, a second lens, a third lens, a fourth lens, and a fifth lens;
   wherein the optical imaging lens satisfies following formula:

$$24 < (V5-V4)/(TL5-TL4) < 42, \ 48 < FOV/FNO < 52;$$

wherein V4 is a dispersion coefficient of the fourth lens, V5 is a dispersion coefficient of the fifth lens, TL4 is a distance from an object surface of the fourth lens to an image plane of the optical imaging lens along an optical axis, TL5 is a distance from an object surface of the fifth lens to the image plane along the optical axis, FOV is a field of view of the optical imaging lens, and FNO is F-number of the optical imaging lens;
   the optical imaging lens further satisfies following formula:

$$3.86 \text{ mm} \le EFL < 4 \text{ mm};$$

wherein EFL is a focal length of the optical imaging lens.

2. The optical imaging lens of claim 1, wherein an object surface of the first lens is concave near the optical axis, and an image side of the first lens is concave near the optical axis;
   an object surface of the second lens is convex near the optical axis, and an image surface of the second lens is convex near the optical axis;
   an object surface of the third lens is convex near the optical axis, and an image surface of the third lens is concave near the optical axis;
   the object side of the fourth lens is concave near the optical axis, and an image side of the fourth lens is convex near the optical axis;
   the object side of the fifth lens is convex near the optical axis, an image surface of the fifth lens is concave near the optical axis, and each of the object surface and the image surface of the fifth lens has at least one inflection point.

3. The optical imaging lens of claim 1, further satisfying following formula:

$$36°/\text{mm} < FOV/TL4 < 64°/\text{mm}.$$

4. The optical imaging lens of claim 1, further satisfying following formula:

$$66°/\text{mm} < FOV/TL5 < 115°/\text{mm}.$$

5. The optical imaging lens of claim 1, further satisfying following formula:

$$1.5 < Imgh/EPD < 4,$$

wherein, Imgh is half of image height corresponding to a maximum field of view of the optical imaging lens, and EPD is an entrance pupil diameter of the optical imaging lens.

6. The optical imaging lens of claim 1, further satisfying following formula:

$$1.6 < TTL/Imgh < 4.4;$$

wherein TTL is a distance from an object surface of the first lens to the image plane along the optical axis, and Imgh is half of image height corresponding to a maximum field of the optical imaging lens.

7. The optical imaging lens of claim 1, further satisfying following formula:

$$2.5 < V4/V5 < 3.$$

8. An imaging module, comprising:
   an optical imaging lens, from an object side to an image side, composed of a first lens, a second lens, a third lens, a fourth lens, and a fifth lens; and
   an optical sensor arranged on the image side of the optical imaging lens;
   wherein the optical imaging lens satisfies following formula:

$$24 < (V5-V4)/(TL5-TL4) < 42, 48 < FOV/FNO < 52;$$

wherein V4 is a dispersion coefficient of the fourth lens, V5 is a dispersion coefficient of the fifth lens, TL4 is a distance from an object surface of the fourth lens to an image plane of the optical imaging lens along an optical axis, TL5 is a distance from an object surface of the fifth lens to the image plane along the optical axis, FOV is a field of view of the optical imaging lens, and FNO is F-number of the optical imaging lens;
   the optical imaging lens further satisfies following formula:

$$3.86 \text{ mm} \le EFL < 4 \text{ mm};$$

wherein EFL is a focal length of the optical imaging lens.

9. The imaging module of claim 8, wherein an object surface of the first lens is concave near the optical axis, and an image side of the first lens is concave near the optical axis;
   an object surface of the second lens is convex near the optical axis, and an image surface of the second lens is convex near the optical axis;

an object surface of the third lens is convex near the optical axis, and an image surface of the third lens is concave near the optical axis;

the object side of the fourth lens is concave near the optical axis, and an image side of the fourth lens is convex near the optical axis;

the object side of the fifth lens is convex near the optical axis, an image surface of the fifth lens is concave near the optical axis, and each of the object surface and the image surface of the fifth lens has at least one inflection point.

10. The imaging module of claim 8, wherein the optical imaging lens further satisfies following formula:

$$36°/mm < FOV/TL4 < 64°/mm.$$

11. The imaging module of claim 8, wherein the optical imaging lens further satisfies following formula:

$$66°/mm < FOV/TL5 < 115°/mm.$$

12. The imaging module of claim 8, wherein the optical imaging lens further satisfies following formula:

$$1.5 < Imgh/EPD < 4,$$

wherein, Imgh is half of image height corresponding to a maximum field of view of the optical imaging lens, and EPD is an entrance pupil diameter of the optical imaging lens.

13. The imaging module of claim 8, wherein the optical imaging lens further satisfies following formula:

$$1.6 < TTL/Imgh < 4.4;$$

wherein TTL is a distance from an object surface of the first lens to the image plane along the optical axis, and Imgh is half of image height corresponding to a maximum field of the optical imaging lens.

14. The imaging module of claim 8, wherein the optical imaging lens further satisfies following formula:

$$2.5 < V4/V5 < 3.$$

15. An electronic device, comprising:
a housing; and
an imaging module mounted on the housing, the imaging module comprising:
  an optical imaging lens, from an object side to an image side, composed of a first lens, a second lens, a third lens, a fourth lens, and a fifth lens; and
  an optical sensor arranged on the image side of the optical imaging lens;
wherein the optical imaging lens satisfies following formula:

$$24 < (V5-V4)/(TL5-TL4) < 42, 48 < FOV/FNO < 52;$$

wherein V4 is a dispersion coefficient of the fourth lens, V5 is a dispersion coefficient of the fifth lens, TL4 is a distance from an object surface of the fourth lens to an image plane of the optical imaging lens along an optical axis, TL5 is a distance from an object surface of the fifth lens to the image plane along the optical axis, FOV is a field of view of the optical imaging lens, and FNO is F-number of the optical imaging lens;

the optical imaging lens further satisfies following formula:

$$3.86\ mm < EFL < 4\ mm;$$

wherein EFL is a focal length of the optical imaging lens.

16. The electronic device of claim 15, wherein an object surface of the first lens is concave near the optical axis, and an image side of the first lens is concave near the optical axis;

an object surface of the second lens is convex near the optical axis, and an image surface of the second lens is convex near the optical axis;

an object surface of the third lens is convex near the optical axis, and an image surface of the third lens is concave near the optical axis;

the object side of the fourth lens is concave near the optical axis, and an image side of the fourth lens is convex near the optical axis;

the object side of the fifth lens is convex near the optical axis, an image surface of the fifth lens is concave near the optical axis, and each of the object surface and the image surface of the fifth lens has at least one inflection point.

17. The electronic device of claim 15, wherein the optical imaging lens further satisfies following formula:

$$36°/mm < FOV/TL4 < 64°/mm.$$

18. The electronic device of claim 15, wherein the optical imaging lens further satisfies following formula:

$$66°/mm < FOV/TL5 < 115°/mm.$$

* * * * *